(12) United States Patent
Lun

(10) Patent No.: US 11,919,349 B2
(45) Date of Patent: Mar. 5, 2024

(54) DAMPER ASSEMBLY

(71) Applicant: BeijingWest Industries Co., Ltd., Beijing (CN)

(72) Inventor: Saiman Lun, Centerville, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 136 days.

(21) Appl. No.: 17/492,539

(22) Filed: Oct. 1, 2021

(65) Prior Publication Data
US 2023/0108889 A1    Apr. 6, 2023

(51) Int. Cl.
*F16F 9/40*     (2006.01)
*B60G 15/06*    (2006.01)

(52) U.S. Cl.
CPC .................... *B60G 15/06* (2013.01)

(58) Field of Classification Search
CPC . B60G 15/06; F16F 9/3242; F16F 9/34; F16F 9/46; F16F 9/49
USPC ................... 267/221, 226; 188/287
See application file for complete search history.

(56) References Cited

U.S. PATENT DOCUMENTS

| | | | |
|---|---|---|---|
| 5,024,301 A * | 6/1991 | Cook | F16F 9/49 188/287 |
| 5,810,130 A | 9/1998 | Gregg et al. | |
| 6,626,274 B2 * | 9/2003 | Pfundstein | F16F 9/46 267/221 |
| 9,822,837 B2 | 11/2017 | Groves et al. | |
| 10,167,921 B2 | 1/2019 | Flacht et al. | |
| 2006/0049014 A1 | 3/2006 | Vanspauwen | |
| 2011/0101585 A1 * | 5/2011 | Kamae | F16F 9/3242 267/226 |
| 2020/0248775 A1 | 8/2020 | Flacht | |
| 2021/0115998 A1 | 4/2021 | Meinert et al. | |

(Continued)

FOREIGN PATENT DOCUMENTS

| | | |
|---|---|---|
| DE | 102008041114 B3 | 4/2010 |
| ES | 2156791 A1 | 7/2001 |
| ES | 2394948 T3 | 2/2013 |

(Continued)

OTHER PUBLICATIONS

Extended European Search Report dated Jun. 6, 2023 for counterpart European patent application No. 22198770.4.

(Continued)

*Primary Examiner* — Christopher P Schwartz
(74) *Attorney, Agent, or Firm* — William H. Honaker; Dickinson Wright PLLC

(57) ABSTRACT

A damper assembly for a suspension system of an associated vehicle. The damper assembly comprises a cylindrical tube extending along an axis and defining a chamber. A piston is located in the chamber and is moveable along the axis in a compression direction and a rebound direction. The piston includes a piston rod extending from a first end to a piston head. A rebound stop is located on the piston rod between the first end and the piston head. A hydraulic rebound stop ("HRS") piston is located in a HRS chamber. A rebound spring biasing the HRS piston towards the adaptor plate in the HRS chamber. The piston rod is slideably received within the HRS piston in the rebound direction until the rebound stop contacts the rebound head and causes the rebound spring to compress.

19 Claims, 4 Drawing Sheets

(56) References Cited

U.S. PATENT DOCUMENTS

2021/0123495 A1* 4/2021 Sankaran ................ B60G 7/04

FOREIGN PATENT DOCUMENTS

| ES | 2166696 | B1 | | 9/2013 | | |
|----|---------|----|---|--------|---|---|
| FR | 3049507 | B1 | | 7/2020 | | |
| FR | 3086359 | B1 | | 9/2020 | | |
| FR | 3098561 | A1 | | 1/2021 | | |
| FR | 3094433 | B1 | | 3/2021 | | |
| GB | 2158181 | A  | * | 11/1985 | ............. | F16F 9/346 |
| GB | 2156945 | B1 | | 7/1987 | | |
| JP | 2004028167 | A | | 1/2004 | | |

OTHER PUBLICATIONS

First Office Action issued for corresponding Japanese Patent Application 2022-153671 dated Nov. 10, 2023.

\* cited by examiner

DAMPER ASSEMBLY

BACKGROUND OF THE INVENTION

1. Field of the Invention

The present invention generally relates to a damper assembly for a suspension system.

2. Description of the Prior Art

Vehicles, such as automobiles, typically include a suspension system that includes absorber units that are mounted between wheels of the vehicle and a vehicle body or substructure. The suspension is generally configured based on vehicle integration to keep wheels in contact with a driving surface by absorbing energy from forces on the wheels or other portions of the vehicle. As technology continues to evolve, various types of absorber units have been developed. One particularly popular type of absorber unit is configured as a hydraulic cylinder that absorbs forces with telescopic compression. After compression, the hydraulic cylinder "rebounds", expanding the hydraulic cylinder, such that it can be compressed again.

Hydraulic cylinders oftentimes include a hydraulic rebound stop ("HRS") feature in order to increase damping force as the hydraulic cylinder extends near a full rebound position. One prior art HRS feature includes an additional piston located on the piston rod at a distance from the main piston. In operation, the additional piston travels into a secondary cylinder with a tapered groove located at a top of the hydraulic cylinder. As the additional piston travels into the secondary cylinder during a rebound, the tapered grooves generate increasing hydraulic restriction to reduce the impact at an end of travel. Another prior art HRS feature includes a main piston that engages a piston ring to form a HRS chamber. The piston ring seals off a flow at the main piston during a rebound and forces fluid through an annular flow path around the main piston and into a FIRS valve to generate increased damping force. A spring locates the piston ring and compresses as the main piston travels toward full rebound. While these prior art HRS features reduce impact harshness at full hydraulic cylinder extension, impact harshness is not completely eliminated and problems continue to persist such as mechanical wear and tear and unpleasant disruptions to a riding experience.

Accordingly, there is a continuing desire to improve upon the operational framework and efficiency of rebound strop features in suspension systems to offer longevity of operational life and a further reduction to unpleasant and harsh rebound movement.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

The invention provides for a damper assembly with a hydraulic rebound stop ("HRS") feature that offers longevity of operational life and a further reduction to unpleasant and harsh rebound movement.

It is one aspect of the present invention to provide a damper assembly for a suspension system of an associated vehicle. The damper assembly comprises a cylindrical tube extending along an axis and defining a chamber. A piston is located in the chamber and is moveable along the axis in a compression direction and a rebound direction. The piston includes a piston rod extending from a first end to a piston head. A rebound stop is located on the piston rod between the first end and the piston head. A hydraulic rebound stop ("HRS") piston includes a sleeve portion extending to a HRS piston head. A rebound spring pushes the HRS piston from a direction of the first end of the piston towards the rebound stop. The piston rod is slidable within the HRS piston in the rebound direction until the rebound stop contacts the HRS piston and causes the rebound spring to compress.

It is another aspect of the present invention to provide a damper assembly for a suspension system of an associated vehicle. The damper assembly comprises a cylindrical tube extending along an axis and defining a chamber. A piston is located in the chamber and moveable along the axis in a compression direction and a rebound direction. The piston includes a piston rod extending from a first end to a piston head. A rebound stop is located on the piston rod between the first end and the piston head. A hydraulic rebound stop ("HRS") chamber and an adapter plate separating the HRS chamber from the chamber of the cylindrical tube. A HRS piston located in the HRS chamber. A rebound spring pushes the HRS piston towards the adapter plate. The adapter plate defines an opening for receiving the rebound stop to contact the HRS piston and cause the rebound spring to compress.

It is yet another aspect of the present invention to provide a damper assembly for a suspension system of an associated vehicle. The damper assembly comprises a cylindrical tube extending along an axis and defining a chamber. A piston is located in the chamber and moveable along the axis in a compression direction and a rebound direction. The piston includes a piston rod extending from a first end to a piston head. A rebound stop is located on the piston rod between the first end and the piston head. An inner rebound cylinder defines a hydraulic rebound stop ("HRS") chamber. The inner rebound cylinder is connected to the cylindrical tube by an adapter plate separating the FIRS chamber from the chamber of the cylindrical tube. A HRS piston is located in the HRS chamber. A rebound spring is also located in the HRS chamber that pushes the FIRS piston towards the adapter plate. The adapter plate defines an opening for receiving the rebound stop to contact the HRS piston and cause the rebound spring to compress.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
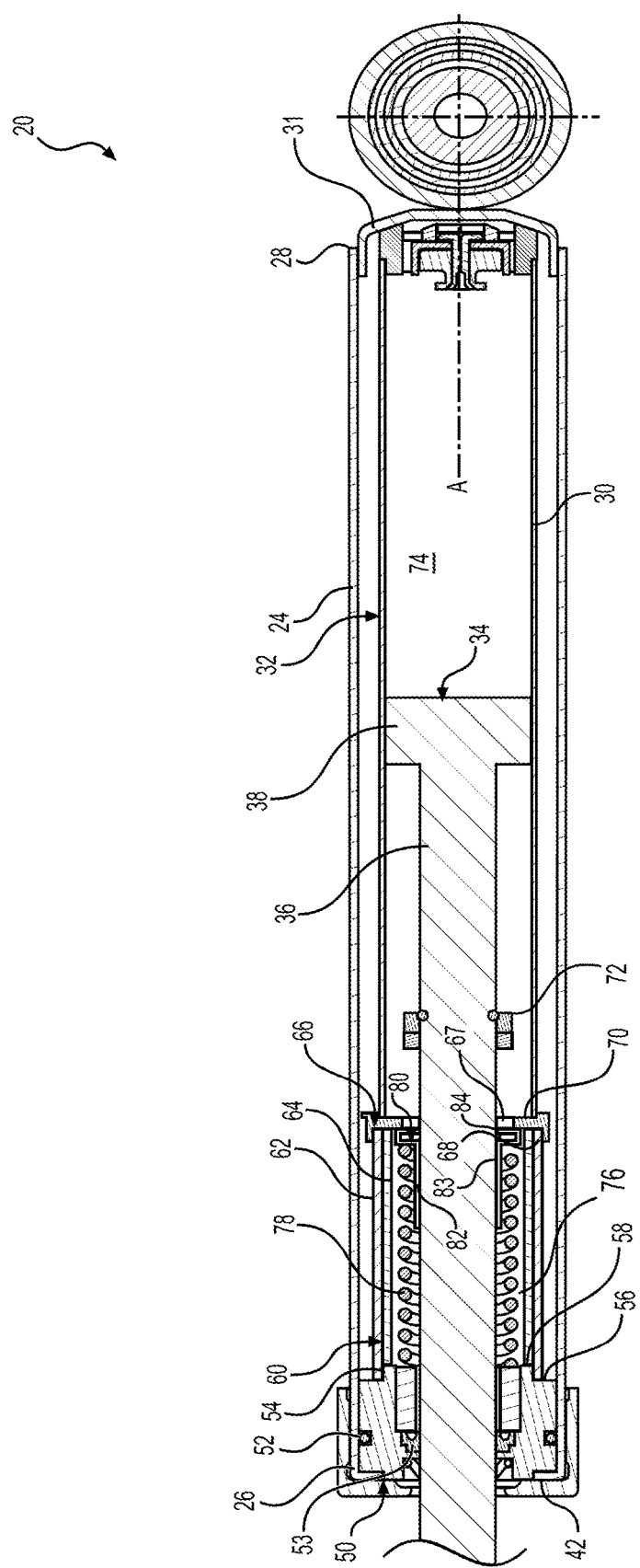
FIG. 1 is a cross-sectional side view of a damper assembly for the suspension system of a vehicle in accordance with principles of the present disclosure.

Example embodiments will now be described more fully with reference to the accompanying drawings. In general, the subject embodiments are directed to a damper assembly for the suspension system of a vehicle. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a damper assembly is provided for the suspension system of a vehicle. The damper assembly improves upon the operational framework and efficiency of hydraulic rebound strop ("HRS") features in suspension systems to offer longevity of operational life and a further reduction to unpleasant and harsh rebound movement. In some embodiments, the damper assembly is configured as a twin-tube damper.

With initial reference to FIGS. 1 through 4, the damper assembly 20 has an outer reservoir tube 24 extending along an axis A between a first end 26 and a second end 28. The damper assembly 20 includes a cylinder tube assembly 30 located in the outer reservoir tube 24 extending along the axis A. The cylinder tube assembly 30 includes a cylindrical tube 32 and a piston and rod assembly 34 located within the cylindrical tube 32 and a base valve assembly 31 at the second end 28 of the cylindrical tube 32. The piston and rod assembly 34 includes a piston rod 36 extending to a piston head 38 that is sized similar to an inner diameter of the cylindrical tube 32. The piston head 38 travels from the first end 26 towards the second end 28 during compression (i.e., in a compression direction) and from the second end 28 towards the first end 26 during rebound (i.e., in a rebound direction).

The damper assembly 20 further includes a cover seal assembly 50 located on the first end 26. The first end 26 may include a flange 42 extending radially inwardly that may be roll formed. The seal cover assembly 50 is located in and seals against the outer reservoir tube 24 with an annular seal 52 and seals against the piston rod 36 with a rod seal 53. The seal cover assembly 50 includes an annular step 54 defining a first circumferential surface 56 and a second circumferential surface 58 that extends radially inwardly from the first circumferential surface 56 and axially towards the second end 28.

The damper assembly 20 includes a hydraulic rebound assembly 60 located against the seal cover assembly 50 and extending axially towards the second end 28. The hydraulic rebound assembly 60 includes an outer rebound cylinder 62 and an inner rebound cylinder 64 located in the outer rebound cylinder 62. The outer rebound cylinder 62 abuts the first circumferential surface 56 of the seal cover assembly 50 and the inner rebound cylinder 64 abuts the second circumferential surface 58 of the seal cover assembly 50. An inner diameter of the outer rebound cylinder 62 is equal to or slightly more than the annular step 54 of the seal cover assembly 50 to fit in hugging engagement therearound. The inner rebound cylinder 64 may include one or more tapered grooves that extend axially on the inside surface for additional control of fluid flow from the hydraulic rebound assembly 60.

A rebound adapter plate 66 defines an annular shape and connects the outer rebound cylinder 62 and the inner rebound cylinder 64 to the cylindrical tube 32. More particularly, the rebound adapter plate 66 includes a first side 68 defining an annular depression for locating both the outer rebound cylinder 62 and the inner rebound cylinder 64 and a second side 70 defines an annular depression for locating the cylindrical tube 32. The rebound adapter plate 66 extends radially inwardly towards the axis A and defines an opening 67 for accommodating the piston rod 36 and a rebound stop 72 located on the piston rod 36. The rebound stop 72 is located on the piston rod 36 between the piston head 38 and the first end 26. The cylindrical tube 32 therefore defines a main chamber 74 and the inner rebound cylinder 64 defines a hydraulic rebound stop ("HRS") chamber 76. A rebound spring 78 is located in the HRS chamber 76 and extends from the seal cover assembly 50 to a HRS piston 80. The rebound spring 78 pushes against the HRS piston 80 towards the adapter plate 66. The spring stiffness of the rebound spring 78 may be tuned to provide various level of force for rebound control as needed.

The HRS piston 80 includes a sleeve portion 82 defining a channel 83 for receiving the piston rod 36 such that the sleeve portion 82 slidably to the piston rod 36. The HRS piston 80 further includes a HRS piston head portion 84 that extends radially outwardly and is larger than the opening 67 in the rebound adapter plate 66 such that it is retained in the FIRS chamber 76. In some embodiments, the HRS piston head portion 84 includes an HRS piston head outer diameter that is slightly less than an inner diameter of the inner rebound cylinder 64 to permit fluid to flow between the HRS piston head portion 84 and the inner diameter of the inner rebound cylinder 64. In some embodiments, the HRS piston head portion 84 includes one more apertures extending axially therethrough to permit fluid flow. In some embodiments, the piston head 38 defines a main outer diameter larger than the FIRS piston outer diameter.

With particular reference now to FIG. 1, the damper assembly 20 is shown in a compressed or partially compressed state. The compressed state generally occurs in instances wherein a wheel (not shown) connected to the damper assembly 20 receives some force, for example, when an associated vehicle travels around a curve or over a driving surface with bumps. The force is dissipated as the piston head 38 travels within the cylindrical tube 32 towards the second end 28 along the axis A. Once compressed, pressure accumulated in the main chamber 74 forces the piston head 38 to return within the cylindrical tube 32 towards the first end 28 during a rebound. Because the damper assembly 20 is under constant weight, rebounding may occur in stances wherein there is a reduction in weight. For example, when the associated vehicle travels over a pothole, the sudden reduction in weight causes the piston head 38 to travel within the cylindrical tube 32 towards the first end 28.

Figure 2:
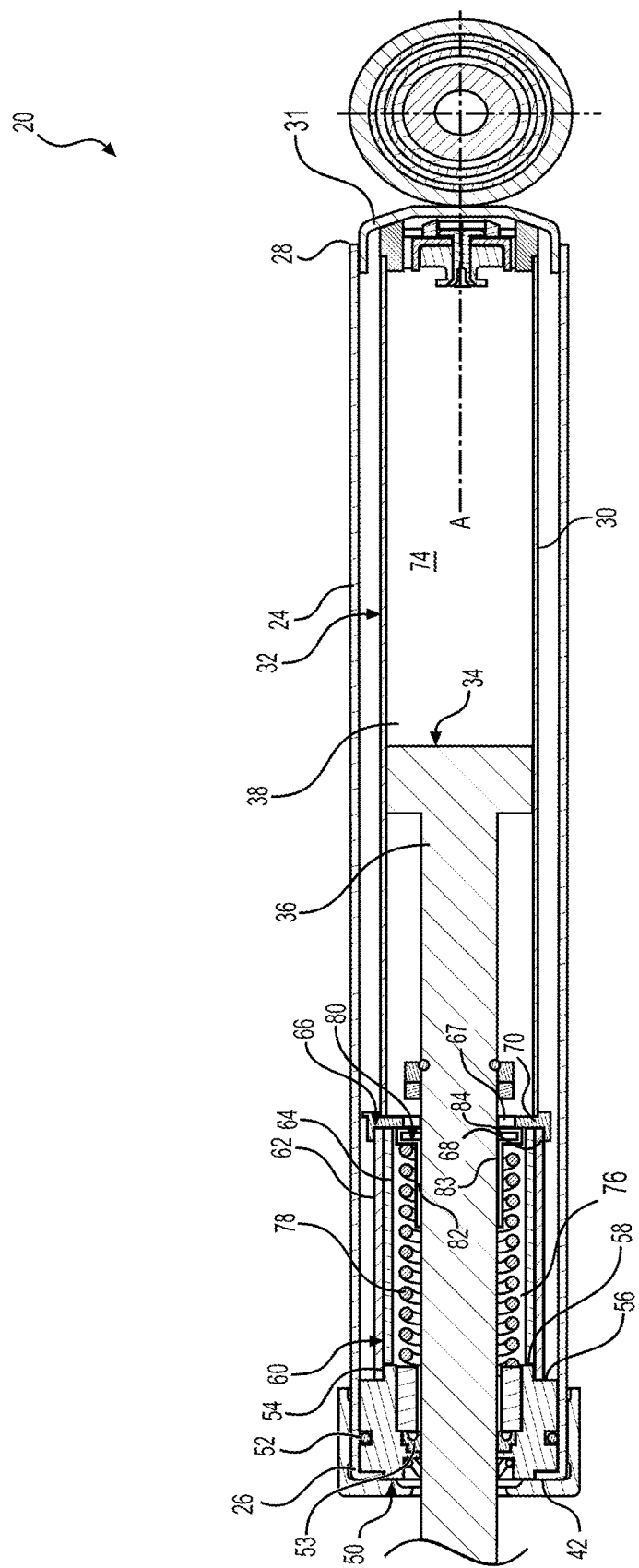
FIG. 2 is a cross-sectional side view of the damper assembly including a rebound assembly in a first rebound stage.
Figure 3:
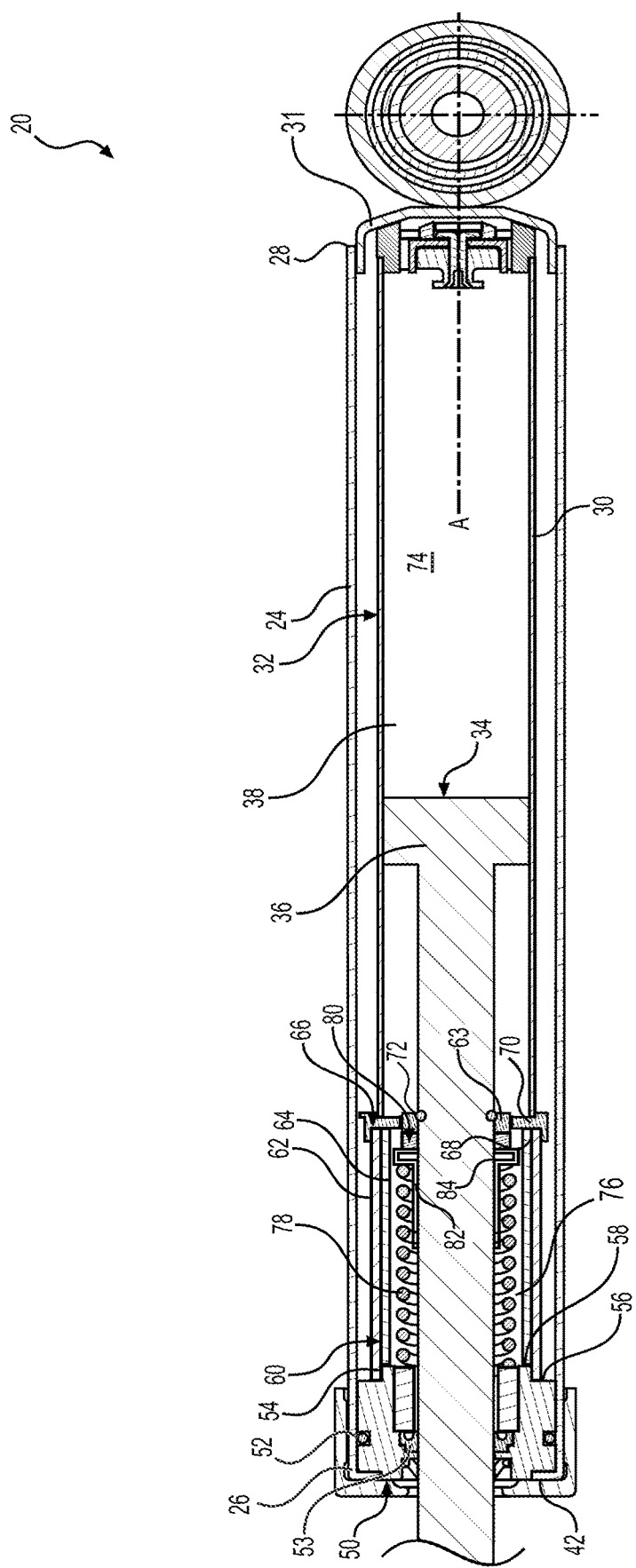
FIG. 3 is a cross-sectional side view of the damper assembly when the rebound assembly is in a second rebound stage.
Figure 4:
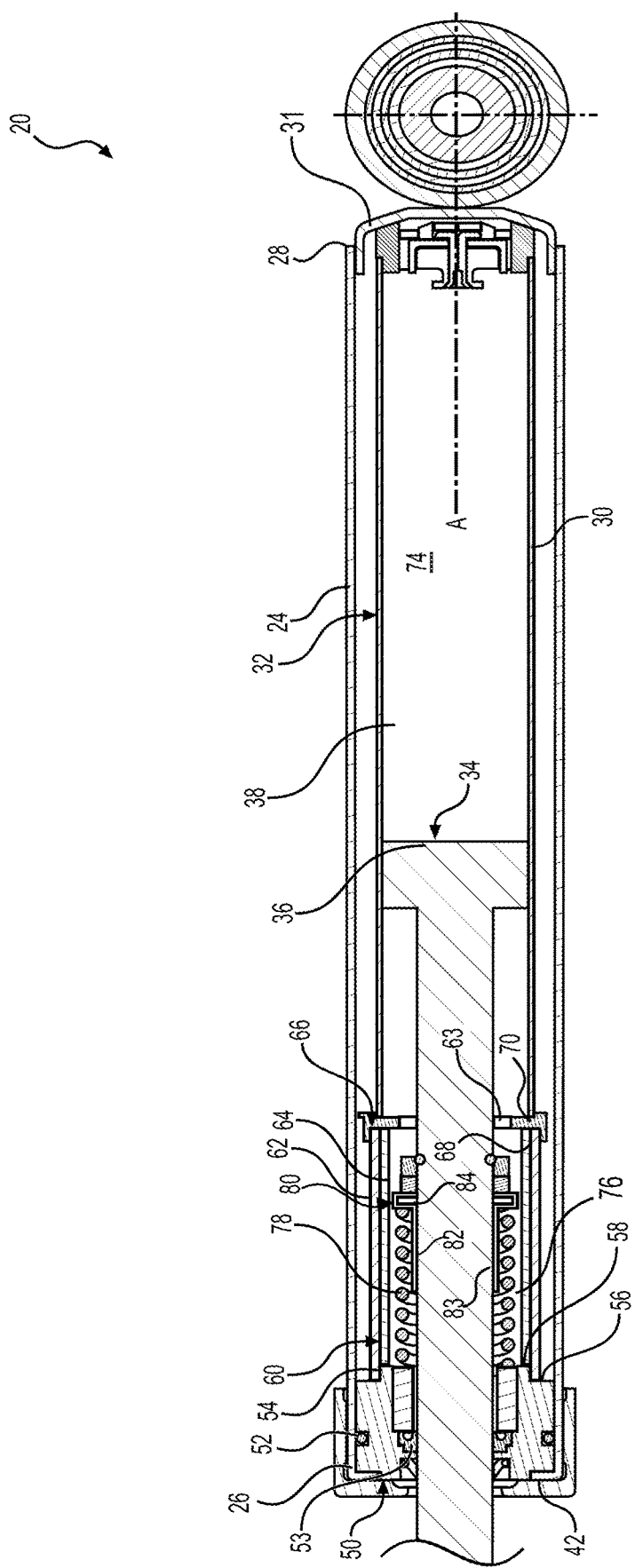
FIG. 4 is a cross-sectional side view of the damper assembly when the rebound assembly is further into the second rebound stage.

With reference now to FIG. 2, the damper assembly 20 is shown in a first rebound stage. In the first rebound stage, the pressure accumulated in the main chamber 74 forces the piston head 38 to return within the cylindrical tube 32 towards the first end 26. The piston rod 36 travels within the opening 67 in the rebound adapter plate 66, the channel 83 in the sleeve portion 82 of the HRS piston 80, and the aperture 48 within the sealing portion 47. FIG. 3 is a cross-sectional side view of the damper assembly 20 when the hydraulic rebound assembly 60 is in a second rebound stage. In the second rebound stage, the rebound strop 72 enters into the opening 67 in the rebound adapter plate 66 and contacts the HRS piston 80 increasing the force required for further rebound travel via the spring load of the rebound spring 78 and fluid transfer within the FIRS chamber 76 around the piston head 84. FIG. 4 is a cross-sectional side view of the damper assembly 20 when the hydraulic rebound assembly 60 is further into the second rebound stage. As illustrated the rebound strop 72 pushes the HRS piston 80 further into the HRS chamber 76.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A damper assembly for a suspension system of an associated vehicle, the damper assembly comprising:
    a cylindrical tube extending along an axis defining a chamber;
    a piston located in the chamber and moveable along the axis in a compression direction and a rebound direction;
    the piston including a piston rod extending from a first end to a piston head;
    a rebound stop located on the piston rod between the first end and the piston head;
    a hydraulic rebound stop ("HRS") piston including a sleeve portion extending to a HRS piston head;
    a rebound spring pushing the HRS piston from a direction of the first end of the piston towards the rebound stop; and
    wherein the piston rod is slidable within the HRS piston in the rebound direction until the rebound stop contacts the HRS piston and causes the rebound spring to compress,
    wherein the HRS piston head portion defines a HRS piston head outer diameter and the piston head defines a main outer diameter larger than the HRS piston outer diameter.

2. The damper assembly as set forth in claim 1, wherein the HRS piston is located in a HRS chamber defined by an inner rebound cylinder.

3. The damper assembly as set forth in claim 2, wherein an adapter plate separates the chamber of the cylindrical tube from the HRS chamber.

4. The damper assembly as set forth in claim 3, wherein the adapter plate defines an opening and wherein the rebound stop is sized to pass through the opening and the HRS piston head is sized larger than the opening.

5. The damper assembly as set forth in claim 4, wherein the adapter plate includes a first side defining an annular depression for locating an end of the inner rebound cylinder and wherein the adapter plate further includes a second side defining an annular depression for locating an end of the cylindrical tube.

6. The damper assembly as set forth in claim 4, wherein the HRS piston head is sized smaller than an inner surface of the inner rebound cylinder to permit fluid to flow around the HRS piston head.

7. The damper assembly as set forth in claim 4, wherein the rebound spring pushes the HRS piston into abutment with the adapter plate.

8. The damper assembly as set forth in claim 1, wherein the rebound spring extends about the sleeve portion of the HRS piston.

9. A damper assembly for a suspension system of an associated vehicle, the damper assembly comprising:
    a cylindrical tube extending along an axis defining a chamber;
    a piston located in the chamber and moveable along the axis in a compression direction and a rebound direction;
    the piston including a piston rod extending from a first end to a piston head;
    a rebound stop located on the piston rod between the first end and the piston head;
    a hydraulic rebound stop ("HRS") chamber and an adapter plate separating the HRS chamber from the chamber of the cylindrical tube;
    a HRS piston located in the HRS chamber;
    a rebound spring biasing the HRS piston towards the adapter plate; and
    wherein the adapter plate defines an opening for receiving the rebound stop to contact the HRS piston and cause the rebound spring to compress.

10. The damper assembly as set forth claim 9, wherein the HRS piston includes a sleeve portion and a HRS piston head portion.

11. The damper assembly as set forth in claim 10, wherein the piston rod is slideably received within the HRS piston.

12. The damper assembly as set forth in claim 10, wherein the rebound spring extends about the sleeve portion of the HRS piston.

13. The damper assembly as set forth in claim 10, wherein the HRS piston head defines a HRS piston outer diameter and the piston head defines a main outer diameter larger than the HRS piston outer diameter.

14. The damper assembly as set forth in claim 9, wherein the HRS chamber is defined by an inner rebound cylinder and wherein the inner rebound cylinder is connected to one end of the cylindrical tube by the adapter plate.

15. The damper assembly as set forth in claim 14, wherein the adapter plate includes a first side defining an annular depression for locating an end of the inner rebound cylinder and wherein the adapter plate further includes a second side defining an annular depression for locating an end of the cylindrical tube.

16. The damper assembly as set forth in claim 9, wherein the HRS piston is sized larger than the opening in the adapter plate.

17. The damper assembly as set forth claim 16, wherein the rebound spring pushes the HRS piston into abutment with the adapter plate.

18. A damper assembly for a suspension system of an associated vehicle, the damper assembly comprising:
- a cylindrical tube extending along an axis defining a chamber;
- a piston located in the chamber and moveable along the axis in a compression direction and a rebound direction;
- the piston including a piston rod extending from a first end to a piston head;
- a rebound stop located on the piston rod between the first end and the piston head;
- an inner rebound cylinder defining a hydraulic rebound stop ("URS") chamber, the inner rebound cylinder connected to the cylindrical tube by an adapter plate separating the HRS chamber from the chamber of the cylindrical tube;
- a HRS piston located in the HRS chamber;
- a rebound spring in the HRS chamber that pushes the HRS piston towards the adapter plate; and
- wherein the adapter plate defines an opening for receiving the rebound stop to contact the HRS piston and cause the rebound spring to compress.

19. The damper assembly as set forth in claim 18, wherein the HRS piston includes a sleeve portion and a HRS piston head portion and wherein the piston rod is slidable within the HRS piston.

* * * * *